April 24, 1956    J. H. FREDETTE    2,743,129
DETACHABLE BAIL FOR CONTAINERS
Filed July 15, 1952

INVENTOR.
JOSEPH HENRY FREDETTE
BY
ATTORNEYS

United States Patent Office 2,743,129
Patented Apr. 24, 1956

2,743,129

DETACHABLE BAIL FOR CONTAINERS

Joseph Henry Fredette, East Orange, N. J., assignor to American Can Company, New York, N. Y., a corporation of New Jersey Application July 15, 1952, Serial No. 298,984

3 Claims. (Cl. 294—31.2)

The present invention relates to a detachable carrying device for containers and more particularly to the provision of a bail attaching means for containers which lack the usual bail ears.

An object of the invention is the provision of a carrying bail which is self adjusting, without the use of tools, in its application to a container and in its removal therefrom.

Another object is the provision of a container carrying bail which is automatically locked in place when the container to which it is applied is picked up.

Numerous other objects and advantages of the invention will be apparent as it is better understood from the following description, which, taken in connection with the accompanying drawings, discloses a preferred embodiment thereof.

Referring to the drawings.

As a preferred or exemplary embodiment of the instant invention the drawings disclose a container carrying device A which is adapted to be slipped over the top of and encircle a container B and which comprises a carrying handle or bail 7 and an expansible locking ring 8.

Figure 1:
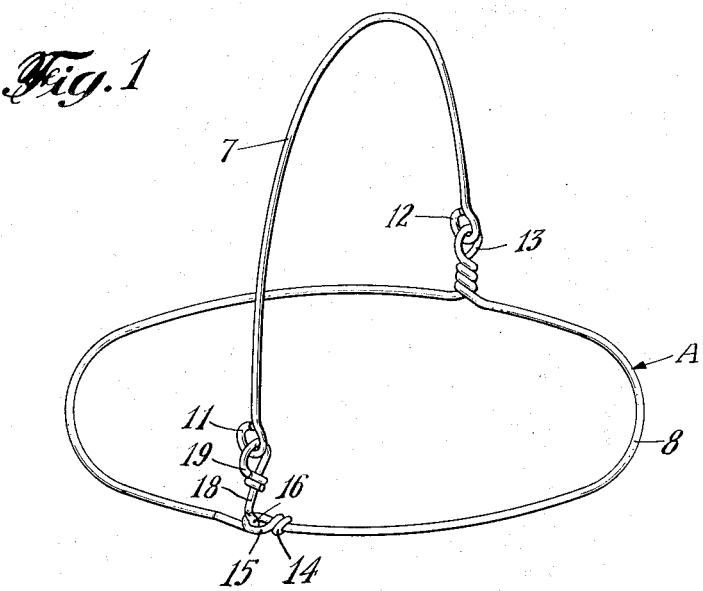
Figure 1 is a perspective view of the improved carrying device of the present invention.

The carrying device A of Fig. 1 may be applied to numerous types of containers of any suitable construction and shape. One preferred form of a container B on which the device A may be effectively used is shown in dot and dash lines in Figs. 2 and 3. The container B may be of the character commonly used for paint and other products and preferably comprises a cylindrical body 9, the outer wall of which is encircled by the ring 8 when the device is on the container. A projection 10, such as a protruding end seam retains the ring on the body. The device, however, may be effectively applied to containers lacking external projections, i. e. containers which are tapered to a greater diameter at their upper ends.

The bail or handle 7 preferably is made of wire or the like material and may be any shape, the ends of the bail terminating in closed hooks or loops 11, 12 for permanent pivotal attachment to the expansible ring 8.

The expansible ring 8 preferably is made from a length of wire or the like material and is bent into the shape of a ring which conforms substantially in size and shape to the cylindrical body 9 of the container B. Intermediate the ends of the ring, the wire is looped and twisted to provide an upright carrying lug 13 in which the hook 12 of the bail 7 is permanently and pivotally engaged.

The ends of the ring 8 are loosely connected together diametrically opposite the carrying lug 13 to provide for the expansible feature of the ring and to provide for a connection with the hook 11 of the bail 7. For this purpose one end of the ring 8 is bent back on itself and is twisted as at 14 to form a closed eye 15 which preferably lies in substantially the same plane as the ring 8. Adjacent the eye 15, the other end of the ring 8 is bent downwardly and thence upwardly in a curved section 16 which provides a locking notch 17. Above the notch 17, the ring 8 is formed with a short upwardly projecting extension 18 which is disposed at an angle to the plane of the ring and is inclined toward the eye 15. This extension projects up through the eye 15 and is slidable therein and terminates in a twisted carrying lug 19 which is similar to the diametrically opposite carrying lug 13 and permanently engaged with the hook 11 of the bail 7.

Figure 2:
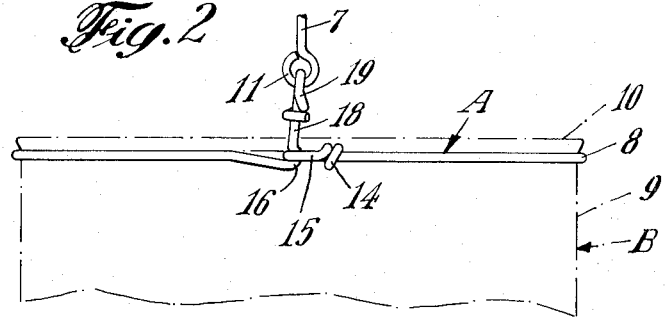
Fig. 2 is a side view of the improved carrying device locked around a container.
Figure 3:
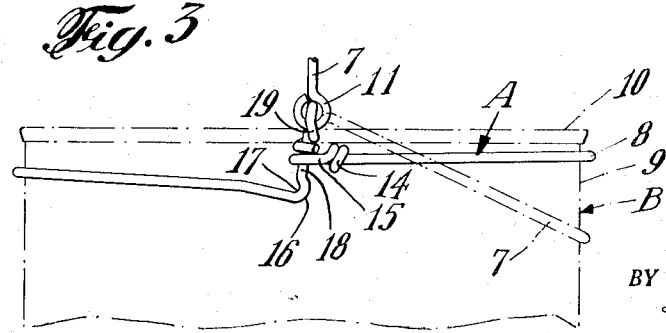
Fig. 3 is a view similar to Fig. 2 showing the device in the process of being applied and/or removed from a container.

In applying the carrying device A to a container B it is merely necessary to push the inclined extension 18 of the ring 8 down in its eye 15 as far as it will go to expand the ring 8 thereby temporarily enlarging its diameter and then slip the expanded ring over the top end of the container B as best shown in Fig. 3. The inclination of the extension 18 relative to the plane of the ring 8 provides for sufficient expansion of the ring to permit easy passage of the ring over the end of the container. With the ring 8 encircling or surrounding the container B as shown in Fig. 3 an upward pull on the bail 7, as in lifting the container by the bail, slides the inclined extension 18 upwardly in the eye 15 and thus draws the ring 8 taut around the outer wall of the container body and lifts the locking notch 17 into locking position with the eye 15 as shown in Fig. 2. This securely locks the ring 8 onto the container B preferably under the projecting container seam 10 and thus provides for carrying of the container by the bail 7. In this locked position of the ring 8, the carrying lugs 13, 19 are substantially at the same level to balance the bail 7 and facilitate carrying of the container.

When the device A is desired to be disconnected from the container it is merely necessary to reverse the lifting operation by pushing the extension 18 downwardly, thereby unlocking the notch 17 from the eye 15 and expanding the ring 8 so that the device A may be stripped from the container B.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A carrying device for a paint container or the like having a laterally projecting top end, comprising an expansible ring adapted to be slipped over the top end of said container to encircle the outer body wall of the container, one end of said ring being provided with an eye, the opposite end of said ring being formed with a locking notch and an extension projecting upwardly from said notch and through said eye, and a carrying bail having one of its ends pivotally attached to the upper portion of said extension and the other of its ends pivotally attached to said ring intermediate the ends of the ring, whereby lifting of said bail pulls said locking notch into locking engagement with said eye to lock said ring around the upper body wall of said container for supporting and carrying said container and said ring will remain thus locked when said bail is swung aside on said pivotal attachments.

2. A carrying device for a paint container or the like having a laterally projecting end seam, comprising an expansible ring adapted to be slipped over the end seam of said container to encircle the outer body wall of the container, one end of said ring being provided with an eye, the opposite end of said ring being bent downwardly and thence upwardly to form a locking notch with an extension projecting upwardly from said notch and through said eye, said extension terminating at its upper end in a carrying lug, said ring diametrically opposite said extension having another upwardly extending carrying lug formed therein, and a carrying bail having its ends pivotally attached to said lugs, whereby lifting of said bail pulls said locking notch into locking engagement with said eye to lock said ring against the outer body wall of said container under said seam for supporting and carrying said container and said ring will remain thus locked when said bail is swung aside on its said pivotal attachments with said lugs.

3. A carrying device for a paint container or the like having a laterally projecting end seam, comprising an expansible wire ring adapted to be slipped over the end seam of said container to encircle the outer body wall of the container, one end of said wire ring being looped and twisted to provide a closed eye, the opposite end of said wire ring being bent to form an angularly disposed extension projecting upwardly through said eye, said extension being provided with a locking notch formed at its lower end, the upper and terminal end of said extension being looped and twisted into a carrying lug, said wire ring being looped and twisted diametrically opposite said extension to form a second upwardly projecting carrying lug, and a wire bail having on its ends closed hooks permanently and pivotally engaged in said upwardly projecting carrying lugs, whereby lifting of said bail pulls said locking notch into locking engagement with said eye to lock said ring against the outer body wall of said container under said seam for supporting and carrying said container and said ring will remain thus locked when said bail is swung aside on said pivotally engaged lugs and closed hooks.

References Cited in the file of this patent

UNITED STATES PATENTS

| | | |
|---|---|---|
| 1,424,076 | Brautigam | July 25, 1922 |
| 1,498,508 | Streckfuss | June 17, 1924 |
| 1,861,806 | Little | June 7, 1932 |
| 1,993,976 | Nelson | Mar. 12, 1935 |